United States Patent
Kang et al.

(10) Patent No.: US 9,141,144 B2
(45) Date of Patent: Sep. 22, 2015

(54) FLEXIBLE DISPLAY DEVICE WITH FLEXIBLE TOUCH SCREEN PANEL

(71) Applicant: SAMSUNG DISPLAY CO., LTD., Yongin, Gyeonggi-Do (KR)

(72) Inventors: Sung-Ku Kang, Yongin (KR); Hak-Sun Kim, Yongin (KR); Tae-Hyeog Jung, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 66 days.

(21) Appl. No.: 14/157,773

(22) Filed: Jan. 17, 2014

(65) Prior Publication Data
US 2014/0267950 A1    Sep. 18, 2014

(30) Foreign Application Priority Data
Mar. 12, 2013   (KR) .................. 10-2013-0026356

(51) Int. Cl.
*G06F 1/16* (2006.01)
*G06F 3/044* (2006.01)

(52) U.S. Cl.
CPC .............. *G06F 1/1652* (2013.01); *G06F 3/044* (2013.01); *G06F 2203/04102* (2013.01)

(58) Field of Classification Search
CPC .................................. G06F 3/044; G06F 1/16
See application file for complete search history.

(56) References Cited

U.S. PATENT DOCUMENTS

2012/0105344 A1*  5/2012  Ko et al. ................. 345/173
2012/0162099 A1   6/2012  Yoo et al.

FOREIGN PATENT DOCUMENTS

| KR | 10-2010-001826 A | 2/2010 |
| KR | 10-2010-0054899 A | 5/2010 |
| KR | 10-2011-0018194 A | 2/2011 |
| WO | 10-2012-0072793 A | 7/2012 |

* cited by examiner

*Primary Examiner* — Gerald Johnson
(74) *Attorney, Agent, or Firm* — Lee & Morse, P.C.

(57) ABSTRACT

A flexible display device with a flexible touch screen includes, a window substrate divided into an active area and a non-active area outside of the active area, a touch screen panel including a plurality of sensing patterns on the active area and a plurality of sensing lines on the non-active area, the sensing lines coupled to the sensing patterns, a display panel on one surface of the touch screen panel, a transparent adhesive having at least two layers configured to attach the window substrate, the touch screen panel, and the display panel to one another, and a bending compensation portion on the same layer as at least one layer of the transparent adhesive. The flexible display device includes a folding axis in a first direction along which the window substrate, the touch screen panel, and the display panel are to be repeatedly bent.

14 Claims, 4 Drawing Sheets

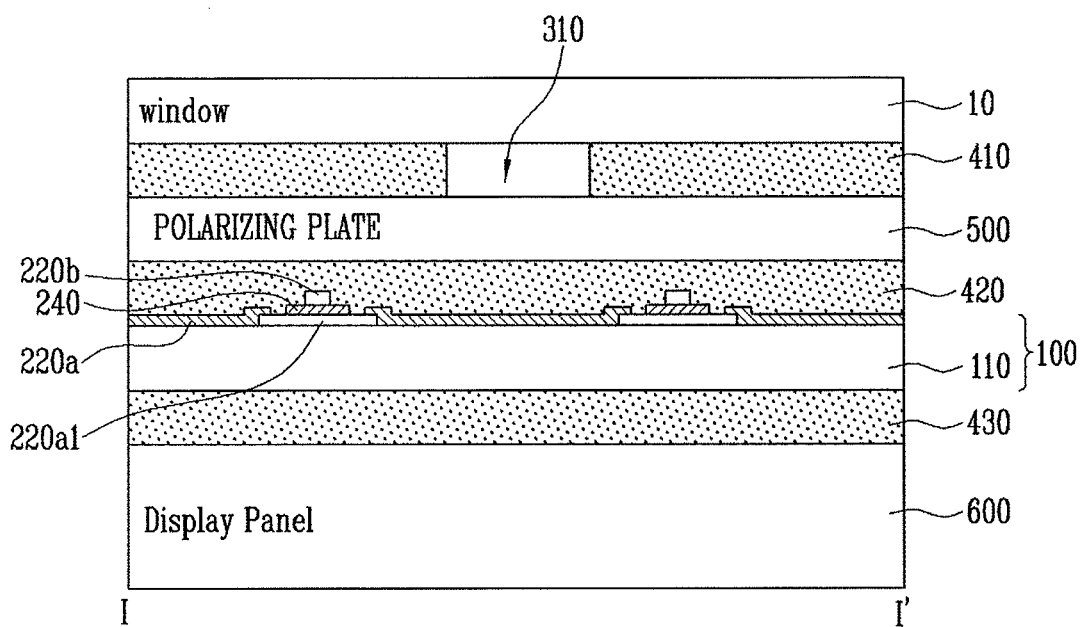

ns of a flexible display device according to an exemplary
FLEXIBLE DISPLAY DEVICE WITH FLEXIBLE TOUCH SCREEN PANEL

CROSS-REFERENCE TO RELATED APPLICATION

This application claims priority to and the benefit of Korean Patent Application No. 10-2013-0026356, filed on Mar. 12, 2013, in the Korean Intellectual Property Office, the entire content of which are incorporated herein by reference in their entirety.

BACKGROUND

1. Field

Embodiments relate to a display device.

2. Description of the Related Art

A touch screen panel is an input device capable receiving a user's commands to select instructions displayed on a screen, e.g., an image display device, or the like, using a hand or an object. The touch screen panel is provided to a front face of the image display device and converts a contact position which is directly contacted with his/her hand or an object into an electrical signal. Therefore, the instruction contents selected at the contact position are recognized as input signals.

Since the touch screen panel as described above may substitute for a separate input device, e.g., a keyboard, a mouse, etc., connected to the image display device and operated, it has been widely used. Types of touch screen panels include a resistive type, an optical sensing type, a capacitive type, and the like. When a user's hand or object contacts a capacitive type panel, a conductive sensing pattern senses a change in the capacitance formed with other adjacent sensing pattern or a ground electrode, or the like, to convert a contact position to an electric signal.

SUMMARY

An embodiment relates to a flexible display device with a flexible touch screen may include: a substrate divided into an active area and a non-active area outside of the active area, a touch screen panel divided to correspond to the active and non-active areas, and a plurality of sensing patterns on the active area, and sensing lines connected to the sensing patterns, formed on the non-active area, a display panel corresponding to one surface of the touch screen panel and attached thereto, a transparent adhesive including at least two adhesive layers attaching the window substrate, the touch screen panel and the display panel to one another, and a bending compensation portion provided on the same layer as at least one of the at least two layers of the transparent adhesive. The flexible display device includes a folding axis in a first direction along which the window substrate, the touch screen panel, and the display panel are to be repeatedly bent.

The bending compensation portion may include: a fluid charging portion extending in the first direction of the active area having the folding axis, a connecting portion extending in a second direction of the non-active area positioned on the side of the active area so as to be in fluid communication with the fluid charging portion, and a fluid pressure controlling portion extending in the first direction of the non-active area, below the active area, so as to be in fluid communication with the connecting portion.

A predetermined fluid may be provided in the bending compensation portion.

Here, the predetermined fluid may be implemented by mixing with a silica gel base inorganic material having higher refractive index than water in a powder type with water, may be implemented of uncured polyimide base, polyacryl base as a liquid polymer, or may be implemented by mixing with a silica gel base inorganic material in a power type.

A polarizing plate may be further included between the touch screen panel and the display panel, the bending compensation portion may include a pair of bending compensation portions on the same layer as a first adhesive layer between the window substrate and the touch screen panel and a second adhesive layer between the touch screen panel and the polarizing plate, respectively.

In a predetermined area of the touch screen panel that overlaps a pair of the bending compensation portion, at least one passage providing fluid communication between the pair of bending compensation portions may be formed.

A polarizing plate may be further included between the window substrate and the touch screen panel, and the bending compensation portion may be formed on the same layer as a transparent adhesive for attaching the window substrate to the polarizing plate.

The window substrate may be formed of at least one of polymethyl methacrylate (PMMA), acryl, polyester (PET), and polyimide (PI).

The sensing patterns may be implemented with first sensing cells formed on a substrate of a polyimide material to be connected in a first direction, first connection lines connecting the adjacent first sensing cells, second sensing cells formed to be connected in a second direction, and second connection lines connecting the adjacent second sensing cells, and an insulating layer may be disposed on an intersecting part between the first connection lines and second connection lines.

Also, the display panel may be implemented as an organic light emitting display panel having flexibility characteristic.

BRIEF DESCRIPTION OF THE DRAWINGS

FIGS. 4A to 4C are cross-sectional views showing a predetermined area (II-II') of the flexible display device according to another exemplary embodiment.

DETAILED DESCRIPTION

Figure 1:
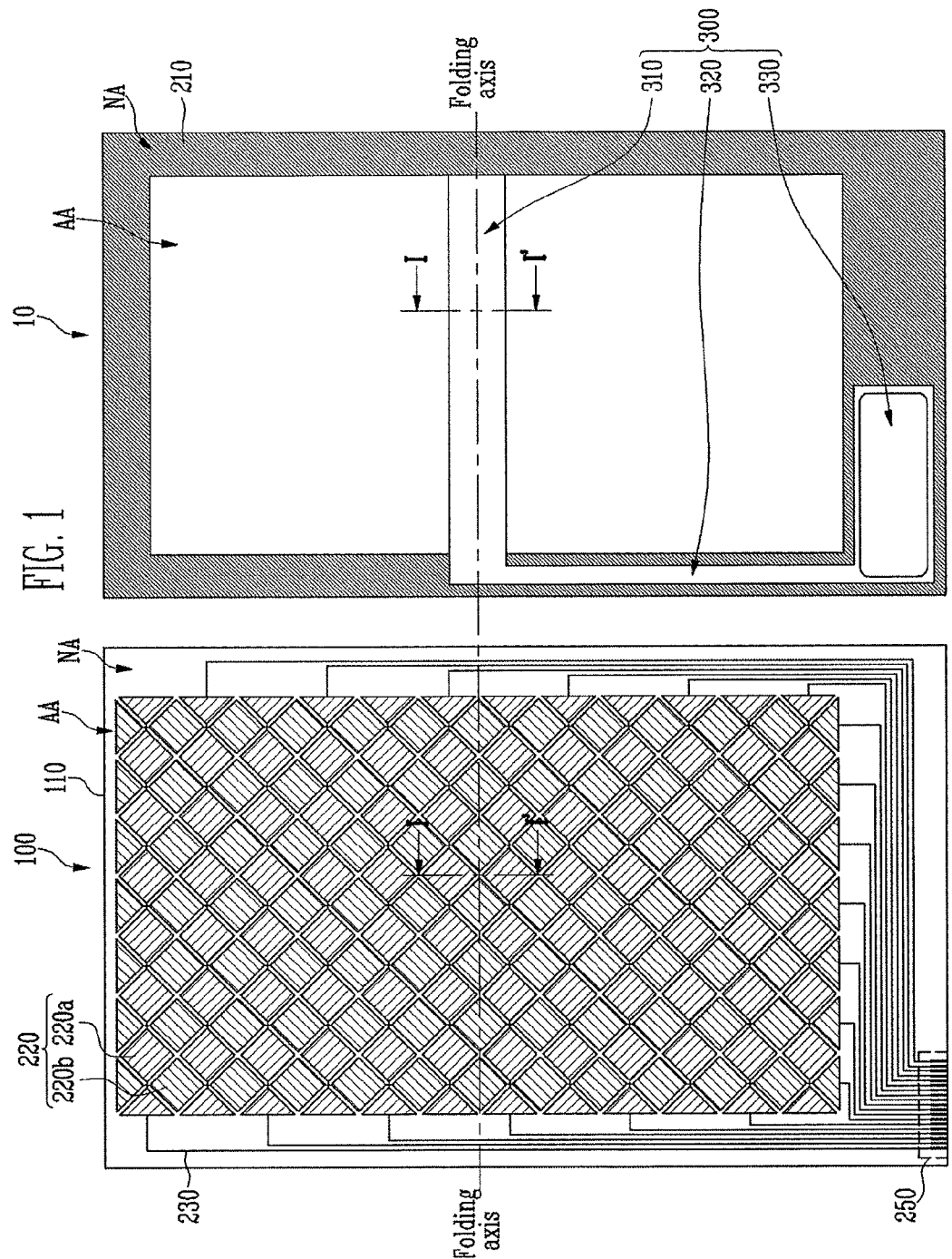
FIG. 1 is a plan view schematically showing some components of a flexible display device according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

Figure 2:
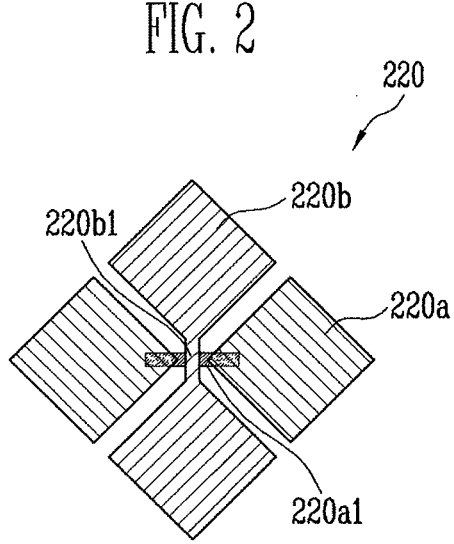
FIG. 2 is an enlarged view of main components of an example of a sensing pattern of the touch screen panel shown in FIG. 1.
Figure 3:
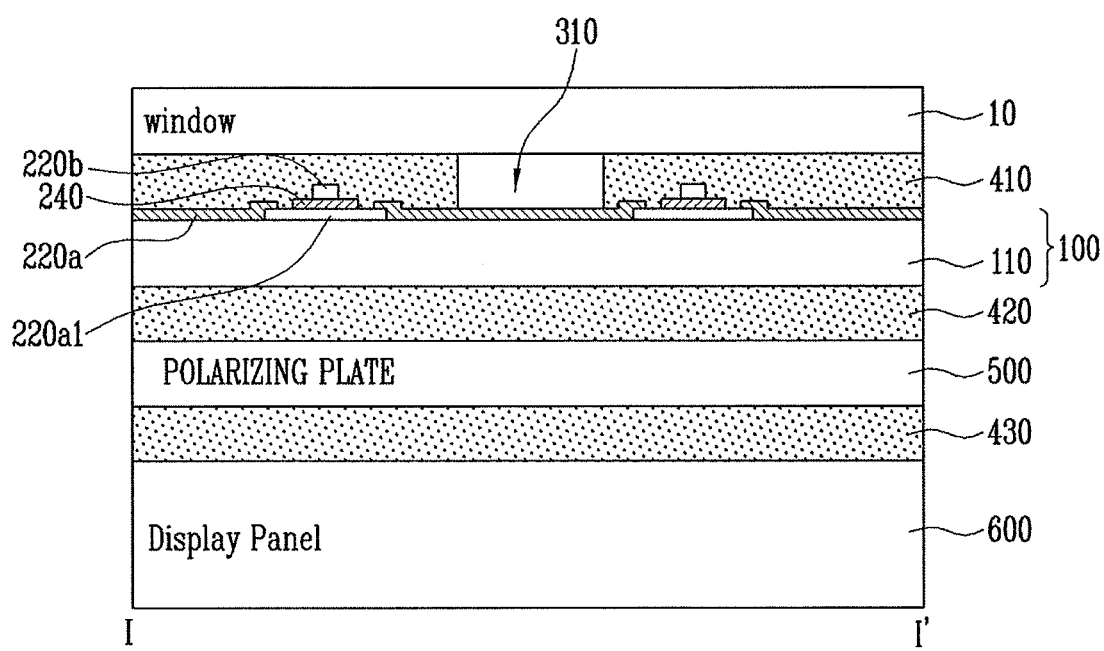
FIG. 3 is a cross-sectional view showing a predetermined area (I-I') of the flexible display device according to an exemplary embodiment.

FIG. 1 is a plan view schematically showing some components of a flexible display device according to an exemplary embodiment. FIG. 2 is an enlarged view of main components of an example of a sensing pattern of the touch screen panel shown in FIG. 1. FIG. 3 is a cross-sectional view showing a predetermined area (I-I', II-II') of the flexible display device according to an exemplary embodiment.

Referring FIG. 1 to FIG. 3, the flexible display device according to an embodiment are implemented with a stack-up structure in which the window substrate 10, a touch screen panel 100, a polarizing plate 500, and a display panel 600 are attached by transparent adhesives 410, 420, and 430, respectively. A bending compensation portion 300 including a fluid charging portion 310, a connecting portion 320, and a fluid pressure controlling portion 330 may be formed on the same layer as the transparent adhesive 410, which secures the window substrate 10 to the touch screen panel 100.

The touch screen panel 100 is divided into an active area AA and a non-active area NA positioned on a peripheral part of the active area. The touch screen panel 100 includes a substrate 110 having flexibility, sensing patterns 220 formed on the active area of the substrate 110, and sensing lines 230 formed on the non-active region of the substrate 110 for connecting the sensing patterns 220 to an outside driving circuit (not shown) through a pad unit 250.

The substrate 110 may be implemented with a material having flexibility, transparency, and high heat resistance/chemical resistance characteristics, e.g., a polyimide (PI). That is, a flexible material having the good heat resistance characteristic relative to other available flexible materials, e.g., polymers, e.g., PI, may be used for a substrate in a thin film shape, rather than conventionally used rigid materials, e.g., glass, PET, PC, etc., in order to secure flexibility. The substrate 110 may have a thickness 0.005 mm to 0.05 mm, e.g., approximately 0.01 mm (10 μm) thickness, to insure flexibility.

The sensing patterns 220, as shown in FIG. 2, include a plurality of sensing cells 220a formed to be connected in each column line along a first direction (column direction), first connection lines 220a1 connecting the first sensing cells 220a in the first direction, second sensing cells 220b formed along a second direction (row direction) in each row line, second connection lines 220b1 connecting the second sensing cells 220b in the first direction, and second connection lines 220b1 connecting the second sensing cells 220b along the second direction. For convenience, only one sensing pattern is shown in FIG. 2, the touch screen panel having a structure that the sensing patterns shown in FIG. 2 are repeatedly disposed.

The first sensing cells 220a and the second sensing cells 220b are alternately disposed so as not to overlap, and the first connection lines 220a1 and the second connection lines 220b1 intersect each other. The first connection lines 220a1 and the second connection lines 220b1 may have an insulating layer (not shown) disposed therebetween to secure stability. The first sensing cells 220a and the second sensing cells 220b may be integrally formed with the first connection lines 220a1 and the second connection lines 220b1, respectively, using a transparent conductive material e.g., indium-tin-oxide (hereinafter, ITO), or may be separately formed and electrically connected.

For example, the second sensing cells 220b may be patterned integrally in the column direction with the second connection lines 220b1, the first sensing cells 220a may be patterned between the second sensing cells 220b so as to have each independent pattern and may be connected in the row direction by the first connection lines 220a1 positioned in an upper portion or a lower portion.

The first connection lines 220a1 may be electrically connected to the first sensing cells 220a at an upper portion or a lower portion thereof by direct contact or through a contact hole. The first connection lines 220a1 as described above may be formed using a transparent conductive material, e.g., ITO, or an opaque low resistance metal material, having a width, or the like adjusted so as to be prevent visibility of the patterns. In addition, the sensing lines 230 shown in FIG. 1 may be electrically connected to a row line unit and a column line unit of the first and the second sensing cells 220a and 220b, and connected to an external driving circuit (not shown), e.g., a position detecting circuit, through a pad unit 250.

Since the sensing lines 230 are disposed on the non-active area, i.e., in a peripheral part of the active area displaying images, there are wide-range of material choices available. For example, the sensing lines 230 may be made of a low resistance metal material, e.g., molybdenum (Mo), silver (Ag), titanium (Ti), copper (Cu), aluminum (Al), molybdenum-aluminum-molybdenum (Mo/Al/Mo), in addition to the transparent electrode material used for forming the sensing pattern 220.

The touch screen panel according to an exemplary embodiment as described above is a capacitive type touch panel, the change of capacitance according to a contact position may be transferred to a side of driving circuit (not shown) from the sensing pattern 220 via sensing lines 230 and the pad part 250. Then, the change in the capacitance is converted into an electrical signal by X and Y input processing circuit (now shown), or the like, such that the contact position is recognized.

In the touch screen panel as described above, the substrate 10 having flexibility along a folding axis, e.g., of the first direction, may be repeatedly bended (or folded) along the folding axis. That is, in order to implement the flexible display device, elements other than the touch screen panel 100, e.g., the window substrate 10, polarizing plate 500, and display panel 600 need to be flexible.

Each of the elements is attached to others using transparent adhesives 410, 420, and 430. When the transparent adhesives 410, 420, and 430 are designed without accounting for the flexible use, i.e., repeat bending, problems in which an element is deformed or separated from each adhesive surface at areas adjacent the folding axis may result.

Therefore, in order to overcome the above problems, a portion of at least one layer of the transparent adhesives 410, 420 and 430 is not formed on a front surface. Exemplary embodiments include a bending compensation portion 300 that includes a fluid charging portion 310 in an area corresponding to the folding axis, a fluid pressure controlling portion 330 constantly maintaining pressure of the fluid charging portion 310, and a connecting portion 320 connecting the fluid charging portion 310 to the fluid pressure controlling portion 330. Accordingly, a fluid volume change corresponding to a bending area when performing a bending is easily realized to thereby secure mechanical stability of the flexible display device.

In the exemplary embodiments shown in FIGS. 1 to 3, the bending compensation portion 300 is included with the transparent adhesive 410 for attaching the window substrate 10 to the touch screen panel 100. In particular, the fluid charging portion 310, the connecting portion 320, and the fluid pressure controlling portion 330 being is on the same layer as the transparent adhesive 410 is described as an example. Alternatively or additionally, the fluid charging portion 310, the connecting portion 320, and the fluid pressure controlling portion 330 may be formed on the same layer as the transparent adhesives 420 and/or 430 between the touch screen panel 100 and the polarizing plate 500 or between the polarizing plate 500 and display panel 600, respectively.

Referring to FIGS. 1 to 3, the window substrate 10 is divided into an active area AA and a non-active area NA positioned on a peripheral part of the active area so as to correspond to the touch screen panel 100 which faces and is attached to the window substrate 10. A black matrix 210 may be formed on the non-active area. The window substrate 10 may be implemented of a transparent material having flexibility, e.g., polymethyl methacrylate (PMMA), acryl, polyester (PET), polyimide (PI), and so forth, rather than a conventional rigid material, e.g., glass.

A display panel having a flexibility described above may be implemented as an organic light emitting display panel. For example, the organic light emitting display panel that is a self light emitting device does not need to have a back light unit, unlike a liquid crystal display device according to the related art. The substrate of the organic light emitting display device may be formed of polymethyl methacrylate PMMA, acryl, polyester PET, or the like, thereby making a flexible display possible.

Referring to FIG. 3, the sensing patterns 220 formed on an active area of the transparent base material 110 may include the first sensing cells 220a formed to be connected in each column along the first direction, the first connection lines 220a1 connecting the first sensing cells 220a in the column direction, the second sensing cells 220b formed to be connected in each row along the second direction, and the second connection lines 220b1 connecting the second sensing cells 220b in the row direction. The insulating layer 240 is disposed on an intersection part of the first connection lines 220a1 and the second connection lines 220b1

Although thickness of the configurations such as transparent adhesives 410, 420, and 430 of the flexible display device are thick for convenience of illustration, the actual thickness of the configurations are much thinner than shown.

In the case of the exemplary embodiments, the bending compensation portion 300 is configured with the transparent adhesive 410 for attaching the window substrate 10 to the touch screen panel 100, a bending compensation portion 300 is formed on the same layer as the transparent adhesive 410, i.e., the fluid charging portion 310, the connecting portion 320, and the fluid pressure controlling portion 330.

Specifically, the fluid charging portion 310 is area including a folding axis, for example, as described above shown in FIG. 1, extends along the first direction of the active area so as to include a folding axis in the first direction.

The connecting portion 320 that serves to connect the fluid charging portion 310 and the fluid pressure controlling portion 330 may overlap the non-active area NA positioned on the side of the active are AA, i.e., the black matrix 210 of the window 10, and extends in the second direction in the non-active area, which is positioned on the side of the active area, so as to be connected to the fluid charging portion 310 formed in the first direction, as shown in FIG. 1.

The fluid pressure controlling portion 330 may overlap the non-active area NA positioned below of the active area AA, i.e., the black matrix 210 of the window substrate 10, and extends in the first direction of the non-active area positioned below of the active area AA so as to be connected to the connecting portion 320 extending in the second direction, as shown in FIG. 1.

The fluid pressure controlling portion 330 may be implemented in a spring shape or a elastic rubber pocket shape having constant elasticity without a separate pressure measuring device, or may be implemented with a pressure controlling portion and a separate pressure measuring device reacted thereto.

Here, a predetermined fluid is charged in the fluid charging portion 310, the connecting portion 320, and the fluid pressure controlling portion 330, and the fluid flows when the bending is generated along the folding axis of the first direction.

That is, when the display device is bent along the folding axis, the volume of the fluid charging portion 310 positioned on the area that overlaps the folding axis is reduced and the pressure thereof is increased, so that the charged fluid in the fluid charging portion 310 is moved to the fluid pressure controlling portion 330 through the connecting portion 320. Then, when the display device returns to a flat state, the volume of the fluid charging portion 310 is secured and the pressure thereof is reduced, and the fluid flow back from the fluid pressure controlling portion 330 to the fluid charging portion 310 through connecting portion 320.

The fluid may be a silica gel based inorganic material having a refractive index ($n=1.5$~$2.5$) higher than that of water ($n=1$) is mixed with water in powder type, and then is implemented so that the fluid has a refractive index similar to that of the substrate material ($n=1.45$~$1.55$). Alternatively, the fluid may be an uncured polyimide base or polyacryl base having a refractive index similar to that of the substrate and/or may use an uncured polyimide base or polyacryl base as a liquid polymer for the silica based inorganic material such that the resultant fluid has a refractive index similar to that of the substrate material.

Through the configuration and operation as described above according to the exemplary embodiment, a change in volume of the fluid corresponding to the bending area when performing a bending is easily accepted, such that the problem of deforming and separating in bending area may be overcome and a mechanical stability of the flexible display device may be secured.

Figure 4A:
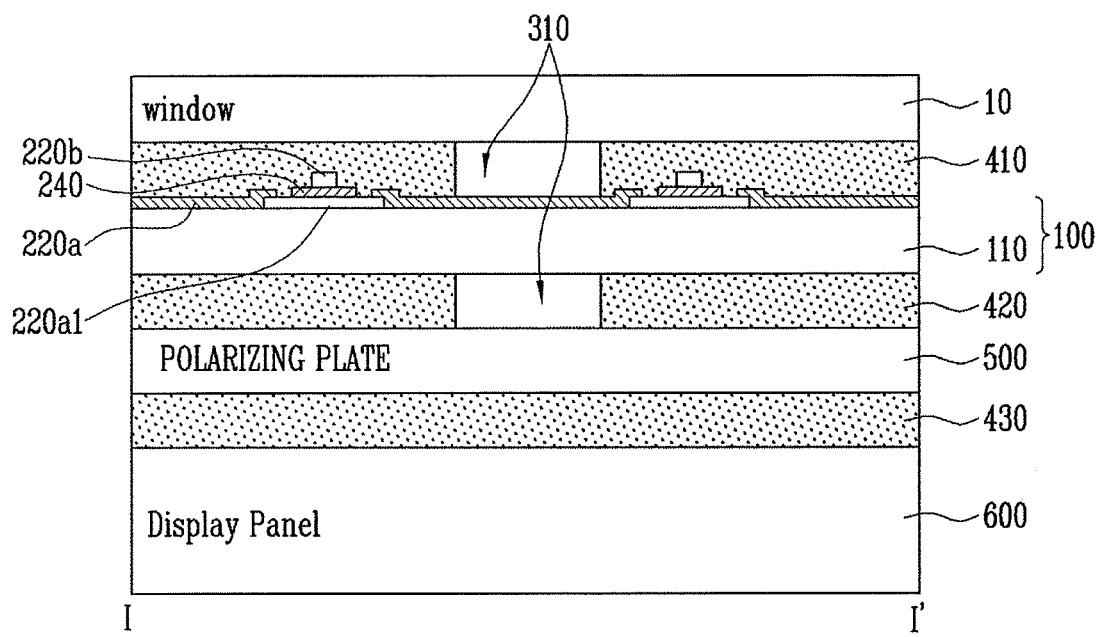
Figure 4B:
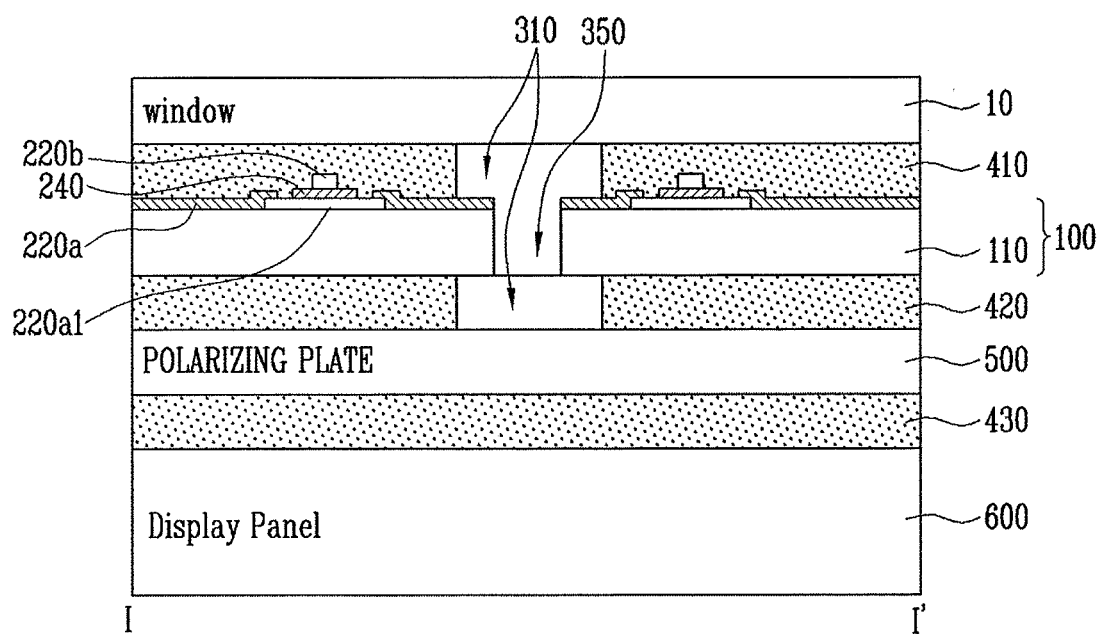

FIGS. 4A to 4C are cross-sectional views showing a predetermined area (II-II') of the flexible display device according to another exemplary embodiment. FIGS. 4A to 4C are cross-sectional views of the flexible display device corresponding to a specific area, i.e., the same area as shown in FIG. 3

For convenience of describing, the components described in FIGS. 1 to 3 will be denoted by the same reference numerals and a description thereof will be omitted.

FIG. 4A illustrates the fluid charging portion 310, the connecting portion 320, and the fluid pressure controlling portion 300 respectively formed on the same layer with the first transparent adhesive 410 for attaching the window substrate 10 to the touch screen panel 100 as well as in a second transparent adhesive 420 between the touch screen panel 100 and the polarizing plate 500.

That is, the fluid charging portion 310, the connecting portion 320, and the fluid pressure controlling portion 330 are provided on the same layer with the first and second transparent adhesives 410 and 420, which are formed on the upper and lower part of the touch screen panel 100, one by one, i.e., as a pair.

Next, referring to FIG. 4B, compared to the exemplary embodiment of FIG. 4A, at least one hole 350 for moving the fluid is formed in a predetermined area of the touch screen panel 100 that overlaps the pair of the fluid charging portions 310.

That is, at least one hole 350 for moving fluid on the active area of the touch screen area corresponding to the bending area having the folding axis, so that fluid may flow between the pair of the fluid charging portion 310 when the touch screen is bent through the hole 350, thereby easily accepting a change in volume of fluid corresponding to the bending area.

Referring to FIG. 4C, unlike FIGS. 3, 4A and 4B, the flexible display device includes the polarizing plate 500 positioned on the upper part of the touch screen panel 100, the transparent adhesive 410 for attaching the window substrate 10 and the polarizing plate 500, the fluid charging portion 310, the connecting portion 320, and the fluid pressure controlling portion 300 formed on the same layer with the transparent adhesive 410.

Here, in order to overcome a problem of implementing a polarizing plate that is flexible, due to a typical thick support layer, one surface of the polarizing plate 500 is directly attached to the window substrate 10 using the transparent adhesive 410 as a supporter, and then a touch screen panel 100 is attached to another surface of the polarizing plate using the transparent adhesive 420.

In this embodiment, compared to a typical polarizing plate, a triacetylcellulose (TAC) support layer may be removed, so that the thickness may be reduced, e.g., by approximately 80 µm and flexibility, i.e., good bending characteristic may be realized.

By way of summation and review, in general, touch screen panels are attached to an external surface of an image display device, such as a liquid display device and an organic light emitting display device. Therefore, the touch screen panel is required to have a high transparency and thin thickness. Also, a flexible display device has been recently developed, therefore, a touch screen panel attached on a flexible display device is also required to have a flexible characteristic. However, the capacitive type touch screen panel in the related art, forms a sensing pattern, or the like, on a glass substrate in general, and the glass substrate needs to have a predetermined thickness to be processed. Therefore, there are disadvantage that a thinness characteristic is not satisfied and a flexible characteristic is not implemented.

Also, the image display device has a polarizing plate attached to an external surface to improve visibility, e.g., by blocking of external light reflection, and has a window substrate attached to the outermost surface of the image display device to improve a strength of device. In this case, the polarizing plate, a window, and a touch screen panel are separately manufactured and attached using an adhesive, or the like, since it is designed regardless of flexible use requirements, i.e., repeated bending or folding conditions. Thus, these elements may be deformed or separated at adhesive surfaces on the region where the bending or folding is repeatedly performed on the display device.

In contrast, as set forth above, in a structure in which a window, a touch screen panel, a polarizing plate, and a display panel having flexibility are attached using a transparent adhesive, a bending compensation portion including a fluid charging portion, a connecting portion, and a fluid pressure controlling portion may be formed on at least one layer of the transparent adhesive, such that the flexible display device is capable of securing a mechanical stability thereof by easily accepting a change in volume of the fluid corresponding to the bending area when the display panel is bent.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A flexible display device with a flexible touch screen, the flexible display device comprising:
    a window substrate divided into an active area and a non-active area outside of the active area;
    a touch screen panel including a plurality of sensing patterns on the active area and a plurality of sensing lines on the non-active area, the sensing lines coupled to the sensing patterns, a display panel on one surface of the touch screen panel;
    a transparent adhesive including at least two adhesive layers that attaches the window substrate, the touch screen panel, and the display panel to one another; and
    a bending compensation portion on the same layer as at least one of the two adhesive layers of the transparent adhesive, wherein the flexible display device includes a folding axis in a first direction along which the window substrate, the touch screen panel, and the display panel are to be bent repeatedly.

2. The flexible display device with a flexible touch screen according to claim 1, wherein the bending compensation portion includes:
    a fluid charging portion along the folding axis of the active area;
    a connecting portion extending in a second direction in the non-active area, the connecting portion being in fluid communication with the fluid charging portion; and
    a fluid pressure controlling portion extending in the first direction of the non-active area, below the active area, and in fluid communication with the connecting portion.

3. The flexible display device with a flexible touch screen according to claim 1, wherein a fluid is provided in the bending compensation portion.

4. The flexible display device with a flexible touch screen according to claim 3, wherein the fluid includes a silica gel inorganic material powder, wherein a refractive index of the silica gel inorganic material powder is higher than that of water.

5. The flexible display device with a flexible touch screen according to claim 3, wherein the fluid includes uncured liquid polymer of polyimide material or polyacryl material.

6. The flexible display device with a flexible touch screen according to claim 3, wherein the fluid includes uncured liquid polymer of polyimide material or polyacryl material and a silica gel inorganic material powder.

7. The flexible display device with a flexible touch screen according to claim 1, wherein the bending compensation portion includes a pair of bending compensation portions on the same layer as a first adhesive layer between the window substrate and the touch screen panel and a second adhesive layer between the touch screen panel and the polarizing plate, respectively.

8. The flexible display device with a flexible touch screen according to claim 7, further comprising at least one passage in that provides fluid communication between the pair of bending compensation portions.

9. The flexible display device with a flexible touch screen according to claim 1, further comprising a polarizing plate between the touch screen panel and the display panel.

10. The flexible display device with a flexible touch screen according to claim 1, further comprising:
a polarizing plate between the window substrate and the touch screen panel, wherein the bending compensation portion is on the same layer as an adhesive layer between the window substrate to the polarizing plate.

11. The flexible display device with a flexible touch screen according to claim 1,
wherein the window substrate include at least one of polymethyl methacrylate (PMMA), acryl, polyester (PET), and polyimide (PI).

12. The flexible display device with a flexible touch screen according to claim 1, wherein the sensing patterns includes:
first sensing cells on a substrate of a polyimide material to be coupled in the first direction;
first connection lines configured to connect the adjacent first sensing cells;
second sensing cells coupled in a second direction; and
second connection lines configured to connect the adjacent second sensing cells.

13. The flexible display device with a flexible touch screen according to claim 12, further comprising an insulating layer at the intersection of the first connection lines and second connection lines.

14. The flexible display device with a flexible touch screen according to claim 1, wherein the display panel includes an flexible organic light emitting display panel.

* * * * *